United States Patent Office 3,236,853
Patented Feb. 22, 1966

3,236,853
TRIAZOLIDINES AND PROCESS FOR
PREPARING THEM
Karl Schmitt and Gerd Driesen, Frankfurt am Main, and
Werner Pfaff, Hofheim, Taunus, Germany, assignors to
Farbwerke Hoechst Aktiengesellschaft vormals Meister
Lucius & Brüning, Frankfurt am Main, Germany, a
corporation of Germany
No Drawing. Filed July 19, 1962, Ser. No. 211,124
10 Claims. (Cl. 260—294.8)

The present invention relates to a process for preparing novel therapeutically interesting triazolidines of the formula

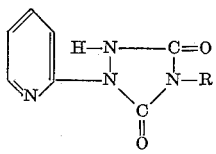
(I)

wherein R represents an α-naphythyl radical, a β-naphthyl radical or the radical

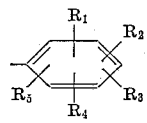

in which $R_1$, $R_2$ and $R_3$ each represent a hydrogen or a halogen atom, an alkyl or alkoxy group having up to 8 carbon atoms, a cycloalkyl group having from 5 to 7 carbon atoms, an aryl group, an aralkyl group whose alkylene part is of low molecular weight, an aryloxy group, an aralkoxy group whose alkylene part is of low molecular weight, an alkyl-thio group of low molecular weight, an arly-thio group, an alkoxy-aryloxy group of low molecular weight or an acyl group, $R_4$ and $R_5$ represent hydrogen, an alkyl or alkoxy group having up to 4 carbon atoms, and if $R_1$, $R_2$ and $R_3$ are alkyl or alkoxy groups having from 5 to 8 carbon atoms, $R_4$ and $R_5$ stand for hydrogen, and their salts, by ring closure reaction from hydrazino pyridines or corresponding derivatives. The compounds are prepared by (a) Treating reactive derivatives of semi-carbazide carboxylic acids of the formulae

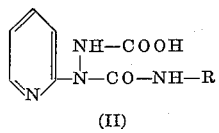 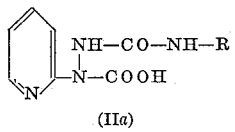
(II)           (IIa)

with alkaline agents or heating them in the absence of alkaline agents or (b) Reacting hydrazino-pyridines of the Formula III

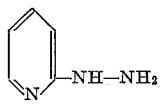
(III)

with reactive N,N-dicarboxylic acid derivatives of amines of the formula R—NH₂ or (c) Reacting semicarbazides of the Formulae IV and IVa

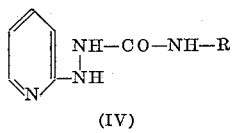 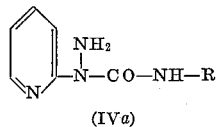
(IV)           (IVa)

with reactive derivatives of carbonic acid or (d) Reacting reactive derivatives of pyridyl hydrazine carboxylic acid of the Formulae V and Va

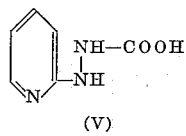 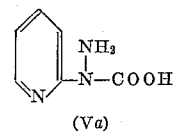
(V)           (Va)

with reactive N-carboxylic acid derivatives of amines of the Formula R—NH₂ in which formulae R has the meaning given above, and, if necessary converting the compounds obtained into salts by means of organic or inorganic acids or bases.

As starting substances for the process according to the invention there may be used reactive derivatives, for instance, of the following compounds corresponding to the Formulae II and IIa:

1-(2-pyridyl)-4-phenyl-semicarbazide-1-
   carboxylic acid,
1- or 2-(2-pyridyl)-4-(2,3- or 4-fluoro-phenyl)-
   semicarbazide-1-carboxylic acid,
1- or 2-(2-pyridyl)-4-(2,3- or 4-chloro-phenyl)-semi-
   carbazide-1-carboxylic acid,
1- or 2-(2-pyridyl)-4-(2,3- or 4-methyl-phenyl)-semi-
   carbazide-1-carboxylic acid,
2-(2-pyridyl)-4-(2-ethyl-phenyl)-semicarbazide-1-
   carboxylic acid,
2-(2-pyridyl)-4-(4-n-octyl-phenyl)-semicarbazide-1-
   carboxylic acid,
2-(2-pyridyl)-4-(4-isopropyl-phenyl)-semicarbazide-1-
   carboxylic acid,
2-(2-pyridyl)-4-(4-n-butyl-phenyl)-semicarbazide-
   1(-carboxylic acid,
2-(2-pyridyl-4-(2,4-dimethyl-phenyl)-semicarbazide-
   1-carboxylic acid,
2-(2-pyridyl)-4-(2,4,6-trimethyl-phenyl)-semicarbazide-
   1-carboxylic acid,
2-(2-pyridyl)-4-(4-cyclohexyl-phenyl)-semicarbazide-
   1-carboxylic acid,
2-(2-pyridyl)-4-[2-(2-methyl-cyclopentyl)-phenyl]-
   semicarbazide-1-carboxylic acid,
1- or 2-(2-pyridyl)-4-(2,3- or 4-diphenyl)-
   semicarbazide-1-carboxylic acid,
2-(2-pyridyl)-4-[4-(phenyl-ethyl)-phenyl]-
   semicarbazide-1-carboxylic acid,
1- or 2-(2-pyridyl)-4-(2,3- or 4-methoxy-phenyl)-
   semicarbazide-1-carboxylic acid,
1- or 2-(2-pyridyl)-4-(2,3- or 4-ethoxy-phenyl)-
   semicarbazide-carboxylic acid,
2-(2-pyridyl)-4-[4-(2-methyl-heptyloxy)-phenyl]-
   semicarbazide-1-carboxylic acid,
2-(2-pyridyl)-4-(4-chloro-2,5-dimethoxy-phenyl)-
   semicarbazide-1-carboxylic acid,
2-(2-pyridyl)-4-[4-(ethoxy-phenoxy)-phenyl]-
   semicarbazide-1-carboxylic acid,
2-(2-pyridyl)-4-(4-benzyloxy-phenyl)-semicarbazide-
   1-carboxylic acid,
1- or 2-(2-pyridyl)-4-3-(methyl-thio-phenyl)-
   semicarbazide-1-carboxylic acid,
2-(2-pyridyl)-4-(2-methoxy-4-phenylthio-phenyl)-
   semicarbazide-1-carboxylic acid,
1- or 2-(2-pyridyl)-4-(1-naphthyl)-semicarbazide-
   1-carboxylic acid,
1- or 2-(2-pyridyl)-4-(2-naphthyl)-semicarbazide-1-
   carboxylic acid.

As hydrazino-pyridines corresponding to Formula III there are mentioned, for example, 2-hydrazino-pyridine, 3-hydrazino-pyridine and 4-hydrazino-pyridine.

Semicarbazides of the Formulae IV and IVa which may be reacted to triazolidines are, for example, those on which the above-mentioned semicarbazide-carboxylic acids are based.

As reactive derivatives of semicarbazide-carboxylic acids of the Formulae II and IIa and of pyridyl-hydrazine-carboxylic acids of the Formulae V and Va there are particularly suitable their esters with alcohols of low molecular weight of phenols as well as their amides.

As reactive N-carboxylic acid derivatives of amines there are understood, for example, their esters with alcohols of low molecular weight or phenols, amides, halides or the isocyanates on which the amines are based, whereas as N,N-dicarboxylic derivatives of amines capable of being used for the triazolidine ring closure reaction there may be used, for instance, their esters with low molecular alcohols or phenols, ester-amides or diamides.

As reactive derivatives of carbonic acid there may be used for example, its halides, amides, esters with low molecular alcohols or phenols, ester halides, ester amides or carbamic acid halides.

The ring closure reaction of the semicarbazide-carboxylic acids corresponding to the Formulae II and IIa by which triazolidines of the above-mentioned formula are obtained, is suitably carried out by treatment with alkaline agents; alkali metal or alkaline earth metal hydroxides, -alcoholates, -amides, -hydrides or -carbonates being most suitable. The reaction can, however, likewise be realized by means of ammonia or organic bases. It can be carried out in the presence or absence of solvents or diluents, such as, for instance, water, alcohols, dialkyl-formamides, e.g. dimethyl-formamide, hydrocarbons such as benzene, toluene or xylene or likewise in mixtures of the above-mentioned substances. In some cases the reaction proceeds already at room temperature, but, in general, it is necessary to apply elevated temperatures in order to attain a sufficient speed of reaction. In such cases it is of advantage to operate near the boiling point of the solvent or diluent used in each case.

The reaction products are obtained in the form of salts which in most cases are easily soluble in water and can, therefore, be easily separated from by-products. On neutralization, the desired triazolidines precipitate from the aqueous solutions. They can then be purified in known manner, for instance by recrystallization. The desired compounds may likewise be prepared without alkaline agents, but higher temperatures are required when operating in this manner. According to the reactivity of the components temperatures up to 220° C. are necessary, it being of advantage to operate in this case without solvents or diluents. The reaction product is isolated by direct recrystallization or by separating at first neutral by-products by treatment with aqueous alkaline substances and precipitation of the triazolidine from the solution by neutralization.

The semicarbazide-carboxylic acid derivatives of the Formulae II and IIa can be prepared, for instance, by heating pyridyl-hydrazine carboxylic acid esters of the Formulae V and Va and, if necessary, substituted phenyl-isocyanates in benzene. On cooling, the reaction products crystallize out or are obtained by distilling off the solvent. The compounds are likewise obtained by reacting semicarbazides of the Formulae IV or IVa with chloroformic acid esters in the presence of triethylamine and in solvents such as benzene.

The reaction of hydrazino-pyridines of the Formula III with reactive N,N-dicarboxylic acid derivatives of amines can be carried out with or without solvents or diluents, the presence of an alkaline agent being of advantage. In general, elevated temperatures are required in order to arrive at a sufficient reaction speed. As alkaline agents may be used, for example, alkali metal or alkaline earth metal alcoholates, -amides, -hydrides, -hydroxides or -carbonates which may be used in catalytic, stoichiometric quantities or in excess. Appropriate solvents or diluents are, for instance, benzene, toluene, xylene, ethanol. The reaction products are obtained in the form of salts or can be converted into the corresponding salts by dissolution in aqueous alkali. By neutralization the desired triazolidines are obtained, which, if necessary, can be purified according to the usual methods, for instance, by recrystallization.

The ring closure reaction of semicarbazides of the Formulae IV and IVa with reactive derivatives of carbonic acid and of reactive pyridyl-hydrazine carboxylic acid derivatives of the Formulae V and Va with reactive N-carboxylic acid derivatives of amines is similar to the above-described reaction. Likewise in this case it is possible to operate with or without alkaline agents and with or without solvents or diluents. Generally, elevated temperatures are required for the reaction. For isolating the desired compounds, the reaction product is advantageously dissolved in water or aqueous alkalies, the by-products are separated off by filtration or extraction with organic solvents and the product is precipitated by neutralisation. If necessary, it can be further purified, for instance, by recrystallization.

The semicarbazides used as starting substances can be prepared, for instance, from hydrazino-pyridines and, if necessary, substituted phenyl-isocyanates. If carried out in benzene, the reaction proceeds already at room temperature with evolution of heat. In most cases, the reaction product is sparingly soluble and can be obtained in pure form after cooling directly by filtration. As reactive derivatives of pyridyl-hydrazine carboxylic acids there are suitable, for instance, pyridyl-hydrazine carboxylic acid esters or amides. The first-mentioned pyridyl-hydrazine-carboxylic acid esters can be prepared, for instance, by introducing into a benzenic solution of equimolar amounts of hydrazino-pyridine and triethylamine equimolar amounts of chloroformic acid esters. As such chloroformiates there are most suitable the alkyl- or phenyl esters of low molecular weight. Upon termination of the exothermic reaction the triethylamine hydrochloride is filtered off in hot state. The reaction product crystallizes out on cooling or is obtained by concentrating the solution. The above-mentioned pyridyl-hydrazine-carboxylic acid amides can be prepared, for instance, according to the method of Fargher and Furness (cf. Journal of the Chemical Society (London) 107, page 691). The 1-pyridyl-3,5-dioxo-1,2,4-triazolidines obtained according to the process of the present invention show acid and basic properties. They can therefore be converted by means of organic or inorganic bases or acids into the corresponding salts. With a view to their being used as medicaments the alkali metal and alkaline earth metal salts are, above all, of importance, since they are in most cases water-soluble; in solution they show a physiological pH-value and as such represent crystalline compounds which may easily be treated.

The alkali metal salts are obtained, for instance, by evaporating aqueous or alcoholic solutions of equimolar amounts of the triazolidine and alkalies or by precipitating the salts from alcoholic solutions with ether or other substances. As alkalies there enter into consideration, for example: sodium, potassium or calcium hydroxide, alkali metal carbonates or alkali metal bicarbonates, ammonia as well as organic bases such as ethanolamine, diethanolamine or triethanolamine. The acid addition salts are obtained according to methods that are identical in principle. As acids there are, for instance, suitable physiologically tolerated inorganic or organic acids.

The products obtained according to the process of the present invention are valuable medicaments. They show, in particular, antiphlogistic properties but are likewise analgesically and hypotensively active.

The following table shows the results obtained in the Aerosil test in the rat's pad when using the 1-(2-pyridyl)-4-(4-chloro-2,5 - dimethoxy-phenyl) - 3,5-dioxo - 1,2,4-triazolidine-Na (IV) and 1-(2-pyridyl)-4-(2-methoxy-4-phenylthio-phenyl)-3,5 - dioxo-1,2,4-triazolidine-Na (V) obtained according to the process of the present invention in comparison with the known compounds showing antiphlogistic activity, i.e. sodium salicylate (I), dimethyl-amino-phenyl-dimethyl-pyrazolone (II) and 1,2-diphenyl-4-n-butyl-3,5-dioxo-pyrazolidine-Na (III).

Since, as it is known, the antiphlogistic activity results in a smaller increase of swelling of the rat's pad treated by means of Aerosil, the superiority of the compounds IV and V obtained according to the process of the present invention over the known antiphlogistics I and II is clearly demonstrated by the values obtained in the tests.

The table furthermore shows that the known compound III hitherto representing the most effective antiphlogistic and the new compounds IV and V may be compared as regards power of action, although likewise in this respect a slightly better activity of the compounds IV and V in comparison to that of the known compound III can be deduced from the 3- and 6-hourly measured values of the swelling. Decisive for the superiority of the compounds prepared according to the process of the invention is, however, their being considerably better tolerated. The $LD_{50}$ of the known compound ascertained in mice amounts to 130 milligrams/kilogram in comparison to 400 milligrams/kilogram or 290 milligrams/kilogram of the new compounds IV or V respectively.

It results from the table that, when using the compounds III, IV or V for attaining an antiphlogistic effect of nearly equal strength, there have to be taken from compounds IV and V only about a half or two thirds of the $LD_{50}$, whereas in the case of the known 1,2-diphenyl-4-n-butyl-3,5-dioxo-pyrazolidine-Na (III) the required dose is higher than the $LD_{50}$. The higher therapeutical index of the products obtained by the process of the present invention resulting therefrom represents a considerable advance in the therapy by means of antiphlogistics.

TABLE

| Preparation | Toxicity $(LD_{50}$ i.v., mg./kg. | Dose, sc., mg./kg. | Increase of swelling in the rat's pad in percents after— | | |
|---|---|---|---|---|---|
| | | | 3 hours | 6 hours | 24 hours |
| I. Sodium salicylate | 500 | 300 | 19 | 45 | 67 |
| II. Dimethylamino-phenyl-dimethyl-pyrazolone | 160 | 100 | 9 | 27 | 72 |
| III. 1,1-diphenyl-4-n-butyl-3,5-dioxo-pyrazolidine-Na | 130 | 150 | 10 | 28 | 32 |
| IV. 1-(2-pyridyl)-4-(4-chloro-2,5-dimethoxy-phenyl)-3,5-dioxo-1,2,4-triazolidine-Na | 400 | 200 | 13 | 24 | 36 |
| V. 1-(2-pyridyl)-4-(2-methoxy-4-phenyl-thio-phenyl)-3,5-dioxo-1,2,4-trizaolidine-Na | 290 | 200 | 8 | 19 | 34 |

The products of the present invention can be applied orally or parenterally, as such or in the form of the corresponding salts, if necessary with admixture of pharmaceutically usual adjuvants and carrier substances. In case of oral application the form of tablets or dragrees is preferred, into which the products obtained by the process of the present invention are incorporated as active ingredients together with the usual carrier substances such as lactose, starch, tragacanth and magnesium stearate. The content of active substance per dosage unit form amounts to 20–500 milligrams.

The following examples serve to illustrate the invention but they are not intended to limit it thereto:

EXAMPLE 1

(a) *1-(2-pyridyl)-hydrazine-2-carboxylic acid ethyl ester*

A solution of 108.5 grams of chloroformic acid ethyl ester in 200 milliliters of absolute benzene is dropwise added, while stirred, into a mixture of 109 grams of 2-pyridyl-hydrazine, 101 grams of triethylamine and 600 milliliters of absolute benzene. The temperature is maintained at about 40° C., if necessary by cooling with water. After additional stirring for 1 hour at room temperature the mixture is heated to the boil for a short period and the triethylamine hydrochloride that has formed is filtered off with suction in hot state. The above-mentioned compound crystallizes from the benzene in the form of weakly yellow crystals. The yield amounts to 124 grams, the melting point to 105–106° C. (from benzene or ethanol).

(b) *2-(2-pyridyl)-4-phenyl-semicarbazide 1-carboxylic acid ethyl ester*

18.1 grams of 1-(2-pyridyl) - hydrazine-2-carboxylic acid ethyl ester, 100 milliliters of benzene and 11.9 grams of phenyl-isocyanate are heated to the boil for 2 hours. The solvent is distilled off and the residue is recrystallized from dilute alcohol. The product obtained forms colorless needles which melt at 110–111° C. The yield amounts to 28 grams.

In an analogous manner the following compounds were produced by using substituted phenyl-isocyanates:

2-(2-pyridyl)-4-(4-ethoxy-phenyl)-semicarbazide-1-carboxylic acid ethyl ester; melting point 157–158° C. (from ethanol)

2-(2-pyridyl)-4-(4-chloro-2,5-dimethoxy-phenyl)-semicarbazide-1-carboxylic acid ethyl ester; melting point 169–170° C. (from dilute alcohol)

2-(2-pyridyl)-4-(2,4-dimethyl-phenyl)-semicarbazide-1-carboxylic acid ethyl ester; melting point 151–152° C. (from dilute alcohol)

2-(2-pyridyl)-4-(4-cyclohexyl-phenyl)-semicarbazide-1-carboxylic acid ethyl ester; melting point 140–141° C. (from dilute alcohol)

2-(2-pyridyl)-4-[4-(4-ethoxy-phenoxy)-phenyl]-semicarbazide-1-carboxylic acid ethyl ester; melting point 126–128° C. (from dilute alcohol)

2-(2-pyridyl)-4-(4-fluoro-phenyl)-semicarbazide-1-carboxylic acid ethyl ester; melting point 154–155° C. (from alcohol)

2-(2-pyridyl)-4-(3-acetyl-phenyl)-semicarbazide-1-carboxylic acid ethyl ester; melting point 148–149° C. (from alcohol)

2-(2-pyridyl)-4-(4-phenoxy-phenyl)-semicarbazide-1-carboxylic acid ethyl ester; melting point 158–159° C. (from alcohol)

2-(2-pyridyl)-4-[4-(1-methyl-heptyloxy)-phenyl]-semicarbazide-1-carboxylic acid ethyl ester; melting point 110–111° C. (from alcohol)

2-(2-pyridyl)-4-(2-methoxy-4-phenyl-thio-phenyl)-semicarbazide-1-carboxylic acid ethyl ester; melting point 150–151° C. (from alcohol)

2-(2-pyridyl)-4-(4-benzyloxy-phenyl)-semicarbazide-1-carboxylic acid ethyl ester; melting point 143–144° C. (from alcohol)

2-(2-pyridyl)-4-(4-diphenilyl)-semicarbazide-1-carboxylic acid ethyl ester; melting point 183–184° C. (from benzene)

2-(2-pyridyl)-4-(3-methyl-thio-phenyl)-semicarbazide-1-carboxylic acid ethyl ester; melting point 130–131° C. (from dilute alcohol)

2-(2-pyridyl)-4-(2-ethyl-phenyl)-semicarbazide-1-carboxylic acid ethyl ester; melting point 119° C. (from alcohol)

2-(2-pyridyl)-4-(4-phenyl-ethyl-phenyl)-semicarbazide-1-carboxylic acid ethyl ester; melting point 161–162° C. (from alcohol)

2-(2-pyridyl)-4-(2-methoxy-phenyl)-semicarbazide-1-carboxylic acid ethyl ester; melting point 166–167° C. (from alcohol)

2-(2-pyridyl)-4-(3-methoxy-phenyl)-semicarbazide-1-carboxylic acid ethyl ester; melting point 117° C. (from dilute alcohol)

2-(2-pyridyl)-4-(4-methoxy-phenyl)-semicarbazide-1-carboxylic acid ethyl ester; melting point 125–126° C. (from alcohol)

2-(2-pyridyl)-4-(4-n-butyl-phenyl)-semicarbazide-1-carboxylic acid ethyl ester; melting point 118–119° C. (from dilute alcohol)

2-(2-pyridyl)-4-(4-n-octyl-phenyl)-semicarbazide-1-carboxylic acid ethyl ester; melting point 68–69° C. (from dilute alcohol)

(c) *1-(2-pyridyl)-4-phenyl-3,5-dioxo-1,2,4-triazolidine*

30 grams of 2-(2-pyridyl)-4-phenyl-semicarbazide-1-carboxylic acid ethyl ester are heated for about 1 hour to the boil in 100 cc. of 2 N-sodium hydroxide solution. Any undissolved matter is filtered off and the solution is neutralized by means of 2 N-hydrochloric acid. The desired triazolidine precipitates and is recrystallized from dilute alcohol. Melting point 200–201° C. Yield 22 grams. The sodium salt is obtained as a colorless powder by evaporating equimolar amounts of the triazolidine with 2 N-sodium hydroxide solution.

The following compounds were produced in an analogous manner:

1-(2-pyridyl)-4-(4-ethoxy-phenyl)-3,5-dioxo-triazolidine; melting point 194° C. (from alcohol)

1-(2-pyridyl)-4-(4-chloro-2,5-dimethoxy-phenyl)-3,5-dioxo-triazolidine; melting point 253–254° C. (from dioxane/petroleum ether)

1-(2-pyridyl)-4-(2,4-dimethyl-phenyl)-3,5-dioxo-triazolidine; melting point 143° C. (from dilute alcohol)

1-(2-pyridyl)-4-(4-cyclohexyl-phenyl)-3,5-dioxo-triazolidine; melting point 191–192° C. (from dilute alcohol)

1-(2-pyridyl)-4-[4-(4-ethoxy-phenoxy)-phenyl]-3,5-dioxo-triazolidine; melting point 148–149° C. (from alcohol)

1-(2-pyridyl)-4-(4-fluoro-phenyl)-3,5-dioxo-triazolidine; melting point 223° C. (from dioxane/water)

1-(2-pyridyl-4-(4-phenoxy-phenol)-3,5-dioxo-triazolidine; melting point 167–168° C. (from alcohol)

1-(2-pyridyl)-4-(3-acetyl-phenyl)-3,5-dioxo-triazolidine; melting point 203–204° C. (from dimethylformamide)

1-(2-pyridyl)-4-[4-(2-methyl-heptyloxy)-phenyl]-3,5-dioxo-triazolidine; melting point 98–99° C. (from dilute alcohol)

1-(2-pyridyl-4-(2-methoxy-4-phenol-thio-phenyl)-3,5-dioxo-triazolidine; melting point 158–159° C. (from alcohol)

1-(2-pyridyl-4-(4-benzyloxy-phenyl)-3,5-dioxo-triazolidine; melting point 200–201° C. (from alcohol)

1-(2-pyridyl)-4-(4-diphenilyl)-3,5-dioxo-triazolidine; melting point 246–247° C. (from dimethylformamide)

1-(2-pyridyl)-4-(3-methyl-thio-phenyl)-3,5-dioxo-triazolidine; melting point 192–193° C. (from dimethylformamide/water)

1-(2-pyridyl)-4-(2-ethyl-phenyl)-3,5-dioxo-triazolidine; melting point 143–144° C. (from dilute alcohol)

1-(2-pyridyl)-4-(4-phenethyl-phenyl)-3,5-dioxo-triazoldine; melting point 254–255° C. (from dimethylformamide/water)

1-(2-pyridyl)-4-(2-methoxy-phenyl)-3,5-dioxo-1,2,4-triazolidine; melting point 221–222° C. (from alcohol)

1-(2-pyridyl)-4-(3-methoxy-phenyl)-3,4-dioxo-1,2,4-triazolidine; melting point 205–206° C. (from alcohol)

1-(2-pyridyl)-4-(4-methoxy-phenyl)-3,5-dioxo-1,2,4-triazolidine; melting point 221–222° C. (from dimethylformamide/alcohol)

1-(2-pyridyl)-4-(4-n-butyl-phenyl)-3,5-dioxo-1,2,4-triazolidine; melting point 134° C. (from dilute alcohol)

1-(2-pyridyl)-4-(4-n-octyl-phenyl)-3,5-dioxo-1,2,4-triazolidine; melting point 123° C. (from dilute alcohol)

1-(2-pyridyl)-4-(2-methyl-4-phenyl-phenyl)-3,5-dioxo-1,2,4-triazolidine; melting point 198–200° C. (from alcohol)

1-(2-pyridyl)-4-(2,5-dimethyl-4-phenoxy-phenyl)-3,5-dioxo-1,2,4-triazolidine; melting point 177–178° C. (from dilute alcohol)

1,(2-pyridyl)-4-(1-naphthyl)-3,5-dioxo-1,2,4-triazolidine; melting point 201–203° C. (from alcohol)

1-(2-pyridyl)-4-(2-naphthyl)-3,5-dioxo-1,2,4-triazolidine; melting point 227–229° C. (from dimethyl-formamide/water)

EXAMPLE 2

(a) *1-(2-pyridyl)-4-(4-chloro-2,5-dimethoxy-phenyl)-semicarbazide*

A solution of 4-chloro-2,5-dimethoxy-phenyl-isocyanate is dropwise added while stirred to 10.9 grams of 2-hydrazinopyridine in 100 ml. of benzene and the mixture is heated to the boil for 1 hour. On cooling, the compound precipitates in the form of colorless crystals. Melting point 180–181° C. (from alcohol). Yield 32 grams.

By using 11.9 grams of phenyl-isocyanate there are obtained in an analogous manner 22 grams of 1-(2-pyridyl)-4-phenyl-semicarbazide of a melting point of 162–163° C. (from alcohol).

(b) *1-(2-pyridyl)-4-(4-chloro-2,5-dimethoxy-phenyl)-semicarbazide-1-carboxylic acid ethyl ester*

To a mixture of 32.2 grams of 1-(2-pyridyl)-4-(4-chloro-2,5-dimethoxy-phenyl)-semicarbazide, 10.5 grams of triethylamine and 300 milliliters of benzene there are added dropwise while stirring 10.9 grams of chloroformic acid ethyl ester in 100 milliliters of benzene. The mixture is then heated to the boil for 2 hours. After cooling it is filtered and the benzene is distilled off. The residue is recrystallized from alcohol. The product forms colorless crystals that melt at 140–142° C. The yield amounts to 29 grams.

(c) *1-(2-pyridyl)-4-(4-chloro-2,5-dimethoxy-phenyl)-3,5-dioxo-triazolidine*

39.5 grams of 1-(2-pyridyl)-4-(4-chloro-2,5-dimethoxy-phenyl)-semicarbazide-1-carboxylic acid ethyl ester are heated to the boil for about 1 hour with 100 ml. of 2 N-sodium hydroxide solution and 50 milliliters of alcohol. After cooling, the mass is filtered, 98 milliliters of 2 N-hydrochloric acid are added and the mixture is adjusted to pH 6 by means of 2 N-acetic acid. The triazolidine that has precipitated is filtered off with suction and recrystallized from dioxane/water. The product forms colorless crystals which melt at 254–255° C. The yield amounts to 27 grams.

The sodium salt is obtained by evaporating aqueous solutions of equimolar amounts of the triazolidine and sodium hydroxide solution or sodium carbonate as a colorless microcrystalline powder which is easily soluble in water.

EXAMPLE 3

*1-(2-pyridyl)-4-(4-ethoxy-phenyl)-3,5-dioxo-triazolidine*

34.4 grams of 2-(2-pyridyl)-4-(4-ethoxy-phenyl)-semicarbazide-1-carboxylic acid ethyl ester with 10 grams of sodium methylate are heated to the boil for 2 hours in 200 milliliters of benzene. After cooling, the sodium salt that has precipitated is filtered off with suction. The salt can be recrystallized from boiling alcohol. There are thus obtained colorless crystals which melt with decomposition within the range of 213 and 218° C. For preparing the free triazolidine the salt is dissolved in water and the solution is adjusted to pH 5–6 by means of 2 N-hydrochloric acid. The triazolidine precipitates and is recrystallized from boiling alcohol. Yield 26 grams; melting point 194° C.

Instead of benzene there can likewise be used ethanol as solvent.

EXAMPLE 4

*1-(2-pyridyl)-4-(4-chloro-2,5-dimethoxy-phenyl)-3,5-dioxo-triazolidine*

39.5 grams of 1- or 2-(2-pyridyl)-4-(4-chloro-2,5-dimethoxy-phenyl)-semicarbazide-1-carboxylic acid ethyl ester are heated for 5 hours in the heating bath to 180–200° C. After cooling, the reaction product is taken up in warm 2 N-sodium hydroxide solution, shaken out with ether, filtered with charcoal and adjusted to pH 6 by means of 2 N-hydrochloric acid. The triazolidine precipitates and is recrystallized from dioxane/petroleum ether. Melting point 253–254° C.

EXAMPLE 5

*1-(2-pyridyl)-4-(4-ethoxy-phenyl)-3,5-dioxo-triazolidine*

11 grams of 2-hydrazino-pyridine, 28 grams of 4-ethoxy-aniline-N,N-dicarboxylic acid-diethyl ester, 11 grams of sodium methylate and 300 milliliters of xylene are slowly heated to 130° C. in an apparatus provided with a descending cooler, while stirring. At about 100° C. the alcohol starts distilling over and the reaction mixture forms a thick magma. After about 30 minutes the alcohol is split off. The mass is stirred for a further 30 minutes at 130° C., cooled and the solid reaction product is filtered off with suction, dissolved in water, the solution is cleaned by shaking it out with ether, filtering with charcoal; it is then adjusted to pH 6 by means of 2 N-hydrochloric acid, whereby the desired triazolidine separates. It is recrystallized from boiling alcohol/water. The yield amounts to 16 grams, the melting point to 194° C.

EXAMPLE 6

*1-(2-pyridyl)-4-(4-chloro-2,5-dimethoxy-phenyl)-3,5-dioxo-triazolidine*

6.4 grams of 1-(2-pyridyl)-4-(4-chloro-2,5-dimethoxy-phenyl)-semicarbazide and 2.5 grams of chloroformic acid ethyl ester are heated for 5 hours in the heating bath to 180–200° C. The reaction product is dissolved by heating it with sodium hydroxide solution, filtered with charcoal and adjusted to pH 6 by means of hydrochloric acid. The triazolidine precipitates and is recrystallized from dioxane and water. Melting point 253–254° C.

EXAMPLE 7

*1-(2-pyridyl)-4-phenyl-3,5-dioxo-triazolidine*

11.4 grams of 1-(2-pyridyl)-4-phenyl-semicarbazide, 6 grams of diethyl-carbonate, 6 grams of sodium methylate and 150 milliliters of xylene are slowly heated in an apparatus provided with a descending cooler to 130° C. while stirring. At about 100° C. the reaction mixture becomes viscous and alcohol is distilling over. The distillation of alcohol terminated, the mixture is additionally stirred for 30 minutes at 130° C., allowed to cool, filtered and the solid reaction product is dissolved in water. The solution is shaken out with ether, filtered with charcoal and adjusted to pH 6 by means of 2 N-hydrochloric acid. The triazolidine precipitates and is recrystallized from boiling alcohol. Yield 10 grams; melting point 201–202° C.

In the same manner there are obtained the following triazolidines by using corresponding semicarbazides:

1-(2-pyridyl)-4-(2-methyl-phenyl)-3,5-dioxo-1,2,4-triazolidine; melting point 183° C. (from alcohol)
1-(2-pyridyl)-3-(3-methyl-phenyl)-3,5-dioxo-1,2,4-triazolidine; melting point 173° C. (from alcohol)
1-(2-pyridyl)-4-(4-methyl-phenyl)-3,5-dioxo-1,2,4-triazolidine; melting point 192–193° C. (from alcohol)
1-(2-pyridyl)-4[4-(3-methyl-butoxy)-phenyl]-3,5-dioxo-1,2,4-triazolidine; melting point 156–157° C. (from dilute alcohol).

EXAMPLE 8

*1-(2-pyridyl)-4-phenyl-3,5-dioxo-triazolidine*

18.1 grams of 1-(2-pyridyl)-hydrazine-2-carboxylic acid ethyl ester and 12 grams of phenyl isocyanate are heated for 5 hours in the heating bath to 180–190° C. After cooling, the reaction product is taken up in 2 N-sodium hydroxide solution, filtered with addition of charcoal and the solution is adjusted to pH 6 by means of hydrochloric acid, whereby the triazolidine precipitates. Melting point 200–201° C. (from dilute alcohol). The same compound is obtained under otherwise equal conditions by using instead of phenyl isocyanate 16.5 grams of N-phenyl-carbamic acid ethyl ester.

EXAMPLE 9

*1-(2-pyridyl)-4-phenyl-3,5-dioxo-triazolidine*

Into a solution of 18.1 grams of 1-(2-pyridyl)-hydrazine-2-carboxylic acid ethyl ester and 16.5 grams of N-phenyl-carbamic acid ethyl ester in 200 milliliters of xylene there are added while stirred 4.8 grams of sodium hydride. The solution is then heated to the boil for 3–4 hours, cooled and the sodium salt of the triazolidine that has precipitated is filtered off with suction. It is cautiously introduced into water, the solution is filtered with addition of charcoal and the reaction product is precipitated by neutralization. Melting point 200° C. (from dilute alcohol).

We claim:

1. A compound selected from the group consisting of triazolidines of the formula

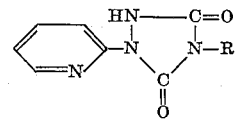

in which R is a member selected from the group consisting of α-naphthyl, β-naphthyl and the radical

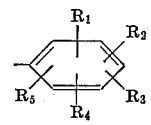

in which $R_1$, $R_2$ and $R_3$ each is a member selected from the group consisting of hydrogen, halogen, alkyl of up to 8 carbon atoms, alkoxy of up to 8 carbon atoms, cycloalkyl of 5 to 7 carbon atoms, phenyl, phenyl lower alkyl, phenoxy, phenyl lower alkoxy, lower alkyl thio, phenyl thio, lower alkoxy phenoxy and lower alkanoyl, $R_4$ and $R_5$ each is a member selected from the group consisting of hydrogen, lower alkyl and lower alkoxy, and in the event $R_1$, $R_2$ and $R_3$ each is a member selected from the group consisting of alkyl of 5 to 8 carbon atoms and alkoxy of 5 to 8 carbon atoms $R_4$ and $R_5$ are hydrogen, and physiologically compatible salts of said triazolidines.

2. The 1-(2-pyridyl)-4-(4-chlor-2,5-dimethoxy-phenyl)-3,5-dioxo-1,2,4-triazolidine.

3. 1-(2-pyridyl)-4-(2-methoxy-4-phenylthio - phenyl)-3,5-dioxo-1,2,4-triazolidine.

4. 1-(2-pyridyl)-4-(3-acetyl-phenyl)-3,5-dioxo - 1,2,4 - triazolidine.

5. 1-(2-pyridyl)-4-(4-n-butyl-phenyl)-3,5-dioxo - 1,2,4-triazolidine.

6. 1-(2-pyridyl)-4-(4-fluor-phenyl)-3,5-dioxo - 1,2,4 - triazolidine.

7. 1-(2-pyridyl)-4-(4-phenoxy-phenyl)-3,5-dioxo - 1,2,4-triazolidine.

8. 1-(2-pyridyl)-4-(4-phenylethyl - phenyl)-3,5-dioxo-1,2,4-triazolidine.

9. 1-(2-pyridyl)-4-(4-diphenilyl) - 3,5 - dioxo - 1,2,4 - triazolidine.

10. 1-(2-pyridyl)-[4-(2-methyl - heptyloxy)-phenyl]-3,5-dioxo-1,2,4-triazolidine.

References Cited by the Examiner

UNITED STATES PATENTS

| 2,833,778 | 5/1958 | Saffer | 260—295 |
| 2,953,572 | 9/1960 | Dunn | 260—295 |
| 2,994,640 | 8/1961 | Zellner | 167—65 |
| 3,006,812 | 10/1961 | Wallace | 167—65 |
| 3,133,933 | 5/1964 | Reischig et al. | 260—308 |

OTHER REFERENCES

Chem., Abst., Subject Index, N–2, vol. 47, p. 1632(S).

WALTER A. MODANCE, *Primary Examiner.*

MORRIS O. WOLK, NICHOLAS S. RIZZO, *Examiners.*